United States Patent [19]

Miyahara et al.

[11] 4,038,530
[45] July 26, 1977

[54] HYBRID COMPUTER FOR DISPLAYING SOUND RAYS OF A SONAR SYSTEM

[75] Inventors: Masahiro Miyahara; Hideo Suzuki, both of Tokyo, Japan

[73] Assignee: Oki Electric Industry Company, Ltd., Tokyo, Japan

[21] Appl. No.: 598,567

[22] Filed: July 24, 1975

[51] Int. Cl.² ...................... G01S 9/66; G06F 15/20
[52] U.S. Cl. ............................. 235/150.53; 340/3 R
[58] Field of Search ........................ 235/150.53, 150.5; 444/1; 340/3 R, 3 C, 3 E, 6 R, 7 PC; 181/.5 ED, .5 AP; 324/77 R

[56] References Cited

U.S. PATENT DOCUMENTS

| | | | |
|---|---|---|---|
| 3,757,287 | 9/1973 | Bealor, Jr. | 340/3 R |
| 3,832,537 | 8/1974 | Marutani | 235/193 |

Primary Examiner—Edward J. Wise
Attorney, Agent, or Firm—Kenyon & Kenyon

[57] ABSTRACT

An apparatus for analyzing sound ray paths of a sonar system by a hybrid computer is disclosed, wherein the sound velocity gradient $g$ is computed by a digital computer and the ray angle $\theta$ and the coordinates $(x, z)$ of the ray path are computed by an analog computer, thus, accurate and high speed analysis of the ray paths can be performed. Further, in the analog computation, the inclination of the sea bottom is taken into consideration by the presence of a reflection computer.

3 Claims, 10 Drawing Figures

HYBRID COMPUTER FOR DISPLAYING SOUND RAYS OF A SONAR SYSTEM

BACKGROUND OF THE INVENTION

The present invention relates to a method and apparatus for simulation, in particular, it relates to a method and apparatus for simulation for computing and displaying sound ray paths transmitted into sea-water in a sonar system.

Sonar (Sound Navigation and Ranging) has been used for locating schools of fish, detecting enemy submarines and navigating ships. There are two kinds of sonars, active sonar and passive sonar. The former transmits ultrasonic waves into sea-water and finds the direction and distance of an object from which wave is reflected by the propagation time and direction of the ultrasonic wave, while the latter finds them from the sound waves which are radiated by the object itself.

A sonar is, generally, designed on the premise that sound waves propagate straight in sea-water. However, sound waves in sea-water actually do not propagate straight but rather, curve because of the temperature and pressure distribution in sea-water. Accordingly, there appears some areas in which an object cannot be found.

Sound ray paths in sea-water have long been manually computed with a calculating table, however, this method is extremely troublesome and time consuming. Accordingly, an automatic sound ray path analyzer has been developed. The prior sound ray path analyzer, which is a special purpose analog computer, calculates the sound ray path of a sonar system from the information of temperature and depth provided by a B/T (Bathy-Thermograph) and displays the sound ray path on a screen of a cathode-ray tube or a pen-type X-Y recorder.

U.S. Pat. No. 3,832,537, owned by the present assignee, is an example of a prior analog computer type sound ray path analyzer.

However, said prior analog computer type sound ray path analyzer has the disadvantage that the calculation error in a divider is very large when a denominator is relatively small.

In order to overcome the above disadvantage, a completely digitalized ray path analyzer has been proposed, which however, has the disadvantage that it takes a very long time to solve a differential equation which is a major step in analyzing the ray path.

SUMMARY OF THE INVENTION

It is an object, therefore, of the present invention to overcome the disadvantages of the prior ray path analyzers by providing a new and improved computer for displaying sound rays.

The above and other objects can be attained by a computer for displaying sound rays having:

a. a pair of switching means for setting sea depth ($Z_i$) and the temperature of sea water ($T_i$);

b. a velocity gradient computer connected to said switching means through a pair of selection circuits, for computing a velocity gradient ($g_i$) with the equation $$g_i = \frac{C_{i+1} - C_i}{Z_{i+1} - Z_i}$$

where $Z_i$, $Z_{i+1}$, and $i$th and ($i+1$)-th sea depth set by switches, and $C_i$ and $C_{i+1}$ are $i$-th and ($i+1$)-th sound velocity in the sea water at the depth $Z_i$ and $Z_{i+1}$, respectively;

c. memory means connected to said velocity gradient computer for storing a plurality of sets of ($g_i$, $Z_i$) in a digital form;

d. a digital-analog converter connected to said memory means through a read out circuit for converting a set ($g_i$, $Z_i$) from a digital form to an analog form;

e. a ray angle computer connected to said digital analog convertor for computing the coordinates ($x, z$) of the ray path on a screen with the equations;

$$\theta = \int g \cos \theta \, dt$$
$$dx = C \cos \theta \, dt$$
$$dz = C \sin \theta \, dt$$

where $C$ is a sound velocity in the sea water at the depth $z$; and f. a comparator for comparing $Z_i$ with $z$ and according to the result of the comparison, controlling the operation of said read out circuit.

BRIEF DESCRIPTION OF THE DRAWINGS

The foregoing and other objects, features and attendant advantages of the invention will be appreciated as the same become better understood by the accompanying drawings wherein.

DETAILED DESCRIPTION OF THE PREFERRED EMBODIMENT

Figure 1:
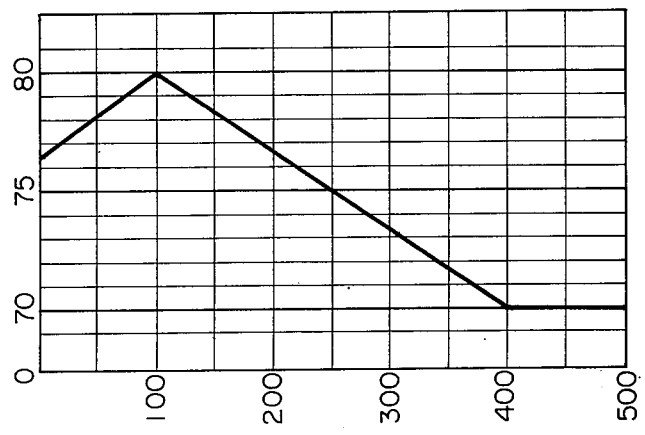
FIG. 1 shows one example of the relationship between the sea-depth and the temperature of the sea-water.

FIG. 1 shows a typical temperature distribution curve in winter, in which the horizontal axis shows temperature (°F) and the vertical axis shows depth of sea (ft). In FIG. 1, water temperature increases linearly from sea-level to a depth of 100 ft, decreases linearly from 100 ft to 400 ft, and is constant in deeper place. A curve like FIG. 1 is directly obtained through the measurement by a B/T (Bathy-Thermograph), and the curve is used in the present invention for setting the relationship between temperature and depth on the apparatus for computing and displaying sound ray paths according to the present invention.

Figure 2A:
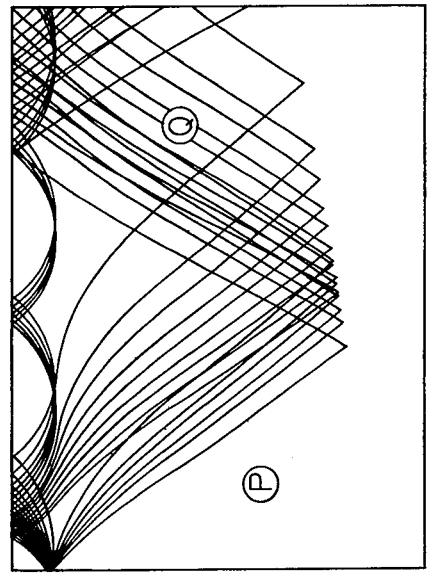
FIGS. 2 (A) and (B) show the embodiments of the sound ray path curves.

FIG. 2(A) shows one embodiment of sound ray path curves in which the horizontal axis is the distance from the sound source in kyd, the vertical axis is the depth from sea level in ft, the source is installed 90 ft below the sea level, and sea bottom is a rising slope of 0.8°. In FIG. 2(A), an object in area P cannot be detected since there is no sound path in the area, while an object in area Q where are many sound paths seems to be able to be detected.

Figure 2B:
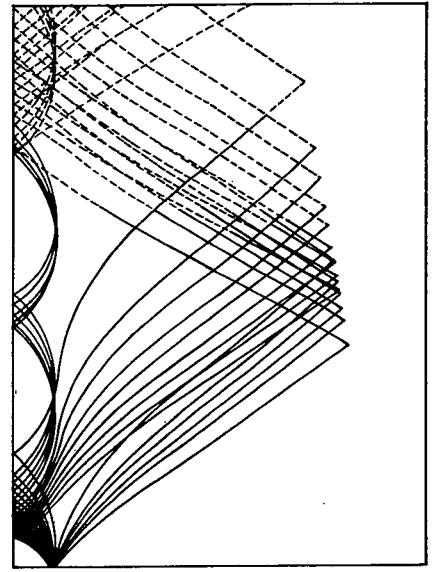

FIG. 2(B) is also embodiment of sound ray path curves in which each external condition is the same as that in FIG. 2(A). In FIG. 2(B), the sound ray paths out of the detection range of the sonar system are displayed with broken lines, which is discriminated from the solid lines of the sound ray paths within the detection range. Accordingly, it is easily recognized that an object located in a broken line area cannot be detected by the sonar system. The system for discriminating the detection range by the broken line is described in detail in said U.S. Pat. No. 3,832,537.

Next, for easy understanding of the present invention, the prior ray path analyzer is explained with reference to FIG. 3, in which the reference numeral 1 is a plurality of water temperature potentiometers, 2 is a plurality of depth potentiometers, 3 and 4 are selection circuits, 5 is a velocity gradient computer, 6 is a ray angle computer, 7 and 8 are output terminals and 9 is a comparator.

A plurality of pairs of potentiometers $(T_i)1$ and $(Z_i)2$ set the water temperature for each sea depth according to the information obtained by a B/T (Bathy-Thermograph). For example, 15 pairs of potentiometers each pair consisting of a single $(T_i)1$ and a single $(Z_i)2$, are installed, and temperature distribution at 15 different points along a vertical line is set.

The selection circuits 3 and 4 select the particular pairs of potentimeters $(T_i, Z_i)$ and $(T_{i+1}, Z_{i+1})$ according to the output of the comparator 9, which compares the latest depth $(z)$ information of the displayed ray path with the output of the depth potentiometer $(Z_i)$, and determines which pair of potentiometers are suitable for the present calculation. That is to say, when the value of the depth $(z)$ of the present ray satisfies $Z_{i+1} > (z) > Z_i$, then $(T_i, Z_i)$ and $(T_{i+1}, Z_{i+1})$ are selected and the voltages from these potentiometers $(T_i, T_{i+1}, Z_i, Z_{i+1})$ are applied to the velocity gradient computer 5.

The velocity gradient computer 5 calculates the velocity gradient $g_i$ from the selected temperatures $(T_i, T_{i+1})$ and the selected sea depth $(Z_i, Z_{i+1})$ by the following equation.

$$g_i = \frac{\Delta C}{\Delta Z} = \frac{C_{i+1} - C_i}{Z_{i+1} - Z_i} \tag{1}$$

where $C_i$ is the velocity of the sound in sea water at temperature $T_i$ and $C_i = C_0 + A_1 T_i - A_2 T_i^2 + b(S-34) + P \cdot Z_i$, $A_1$, $A_2$, $B$ and $P$ are positive constants, $T_i$ is temperature at $i$-th depth $S$ is salinity, $Z_i$ is depth, and $C_0$ is sound velocity at $T_i = Z_i = 0$, $S = 34$.

The ray angle computer 6 calculates the coordinates (horizontal axis $x$, and vertical axis $z$) from the velocity gradient $g$ by the following formula, $$\begin{array}{l} \theta = -\int g_i \cos\theta \, dt \\ dx = C \cos\theta \, dt \\ dz = C \sin\theta \, dt \end{array} \tag{2}$$

where $C$ is a sound velocity in the sea water at the depth $z$.

The formula (2) is deduced from Snell's law $$\left( \frac{C_1}{\cos\Theta_1} = \frac{C_2}{\cos\Theta_2} = \text{constant} \right).$$

The outputs $x$ and $z$ of the ray angle computer 6 are applied to a cathode-ray tube or an X-Y recorder (not shown) for displaying the sound ray path shown in FIG. 2(A).

Figure 3:
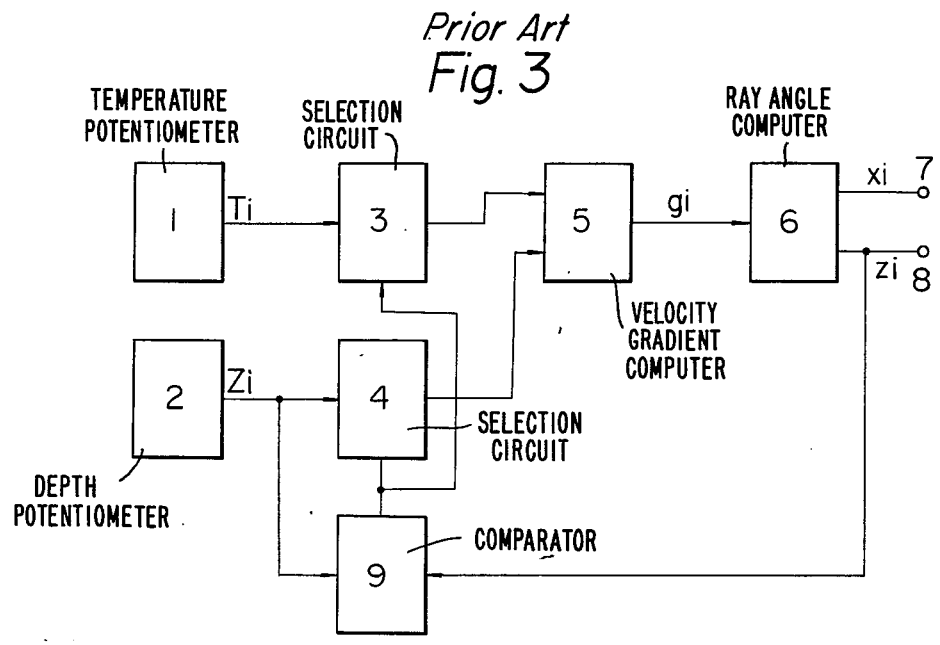
FIG. 3 is a block-diagram of the prior ray path analyzer.

However, an analog ray path analyzer shown in FIG. 3 has the disadvantage that the calulation error is very large. The reason for this is the switching noise generated in the selection circuits 3 and 4, and the error of the equation (1). It should be noted in the equation (1) that the error of the quotient is very large even if the error of the denominator $(Z_{i+1} - Z_i)$ is small.

Figure 4:
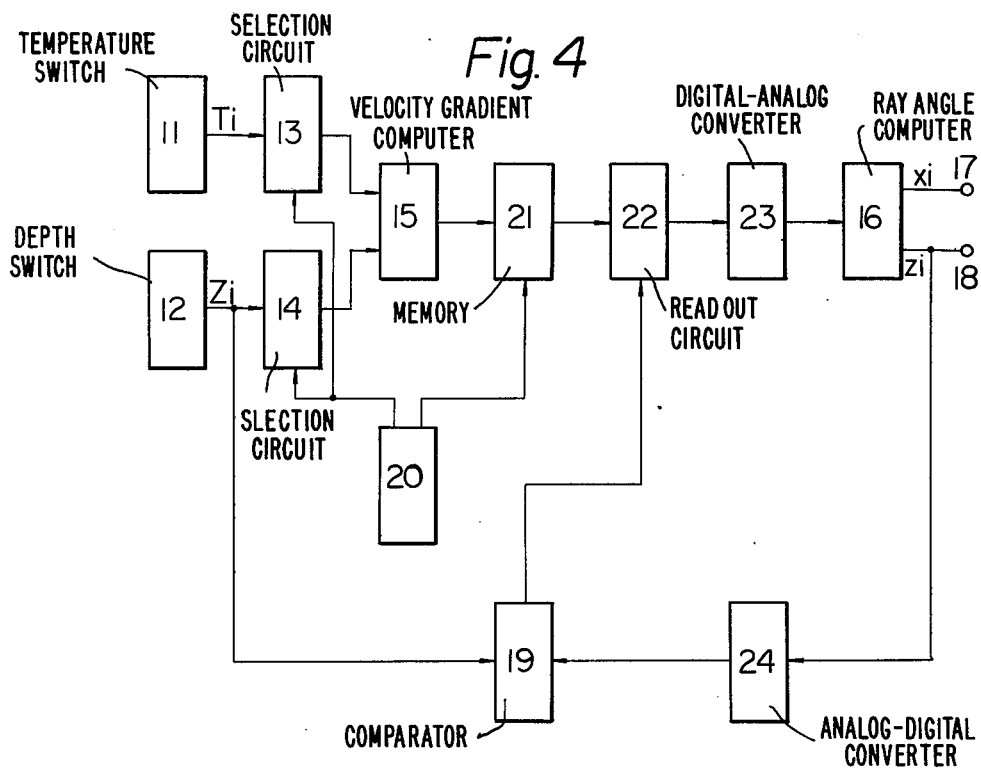
FIG. 4 is a block-diagram of the ray path analyzer according to the present invention.
Figure 5:
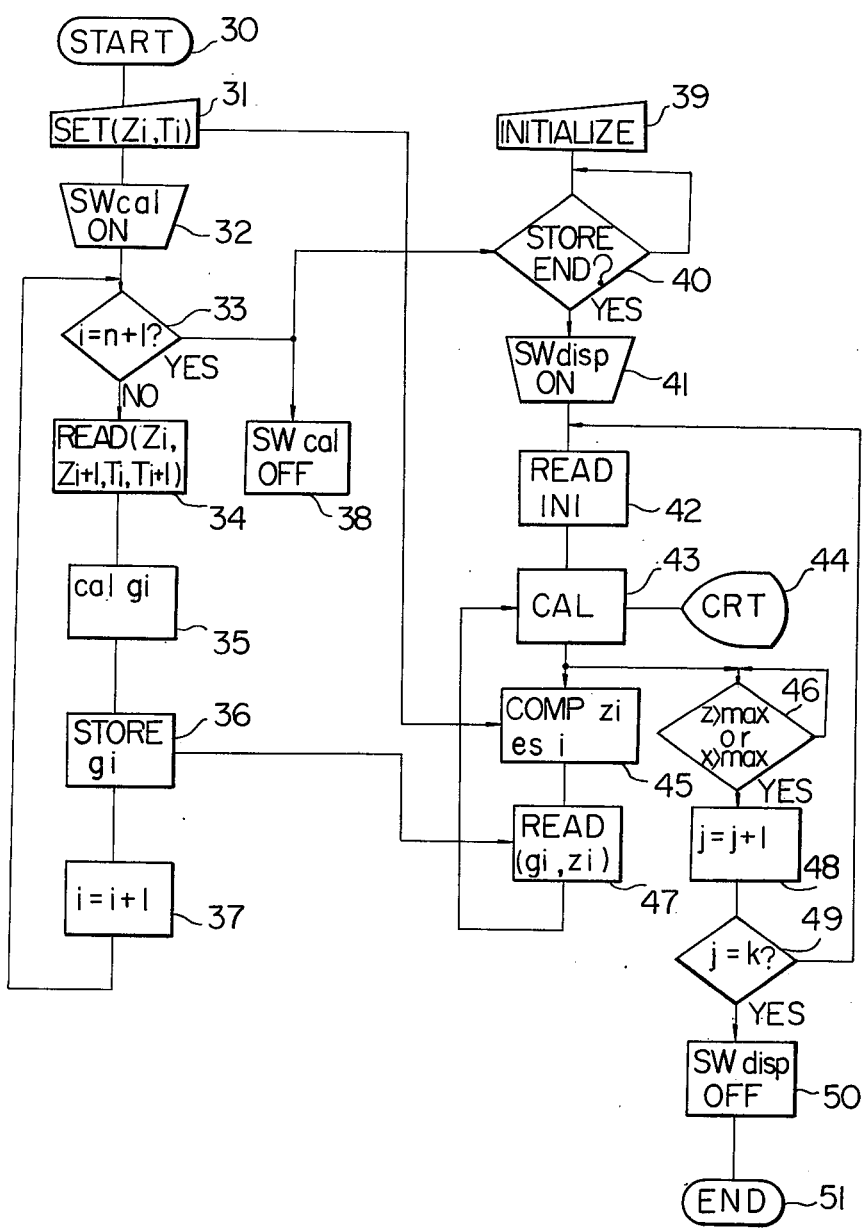
FIG. 5 is a flow-chart showing the operation of the apparatus of FIG. 4.

FIG. 4 is a block-diagram of the ray path analyzer according to the present invention, and FIG. 5 is a flowchart showing the operation of the apparatus of FIG. 4. In FIG. 4, the reference numeral 11 is a plurality of switches for setting temperature, 12 is a plurality of switches for setting sea depth, 13 and 14 are selection circuits, 15 is a velocity gradient computer, 16 is a ray angle computer, f17 and 18 are output terminals, 19 is a comparator, 20 is a control circuit, 21 is a memory, 22 is a read out circuit, 23 is a digital-analog convertor, and 24 is an analog-digital convertor.

In FIG. 4, a plurality of switches $(T_i)11$ and $(Z_i)12$ provides the information concerning the water temperature for each sea depth in a digital form (see box 31 in FIG. 5). Next, the calculation switch (not shown) is turned ON (32 in FIG. 5), then the calculation cycle starts. In the box 33 in FIG. 5, the end of the calculation cycle is checked., that is to say, a value of $i$ of $i$-th cycle is checked if $i = n+1$ ($n$ is a predetermined value). If $i \neq n+1$, then, the selection circuits 13 and 14 read pairs of information $(T_i, Z_i)$ and $(T_{i+1}, Z_{i+1})$ as shown in box 34 in FIG. 5. With this information, the velocity gradient computer 15 computes the velocity gradient $g_i$ (35 in FIG. 5) and stores the result $(g_i)$ with the corresponding value $(Z_i)$ in the memory 21 (36 in FIG. 5). Thus, the list of $(Z_i, g_i)$ is obtained in the memory 21. The computation by the velocity gradient computer 15 is similar to that of the computer 5 in FIG. 3 except that the computer 15 in FIG. 4 is a digital computer and the result $g_i$ in FIG. 4 is more accurate. The operation of the selection circuits 13 and 14, the velocity gradient computer 15, and the memory 21 is controlled by the control circuit 20. Then, the step of the calculation cycle goes to $(i+1)$-th cycle (37 in FIG. 5) and repeats the above mentioned operation (33 through 37 in FIG. 5).

After the completion of calculation of the $n$ number of the sound velocity gradient, the calculation switch is turned OFF (38 in FIG. 5) and the display cycle begins, in which the ray angle is computed from the information of the sound velocity graident according to the right column of the flow-chart in FIG. 5. In the display cycle, first, the condition of the circuit is initialized (39 in FIG. 5), the completion of the calculation cycle is checked (40 in FIG. 5) and the display switch (not shown) is turned on (41 in FIG. 5). Next, the set of initial values $(g_i, Z_i)$ is read from the memory 21 by the read out circuit 22, and these values are converted to an analog form by the digital-analog convertor 23. Using the converted analog values $(g_i, Z_i)$, the ray angle computer 16 computes the coordinates $(x, z)$ of the ray path with the equation (2) explained before (43 in FIG. 5). The improvement of the ray path computer 16 will be described in detail later. The computed coordinates $(x, z)$ of the ray path is displayed on the cathode-ray-tube (not shown, 44 in FIG. 5). The repetition of the above computation of the ray path provides the curves of the ray path as shown in FIG. 2(A). Next, the value of $z$ at the terminal 18 is applied to the analog-digital converter 24, in which the value of $z$ is reconverted to a digital form. The comparator 19 compares the output $z$ of the analog-digital converter 24 with the output $Z_i$ of the depth switch 12, and according to the result of the comparison, the comparator 19 designates the appropriate value of $i$ for reading from the memory 21 (45 in FIG. 5). With the designated value of $i$, the read out circuit 22 reads the set $(g_i, Z_i)$ from the memory 21 for the computation of the ray path (47 in FIG. 5), and with the new set of $(g_i, Z_i)$ the new coordinates of the ray path is computed and displayed (43 and 44 in FIG. 5). When a single line of ray path is completed on a cathode-ray-tube, that is to say when the value of $z$ or $x$ exceeds the predetermined value (46 in FIG. 5), the next line of the ray path is initialized, that is to say, the line number $j$ is changed to $j+1$ (48 in FIG. 5), and the computation of the ray path is performed for the new value of $j$ (42 through 47 in FIG. 5). When all of the lines of the ray path are computed and displayed as shown in FIG. 2(A), that is to say, when the value of $j$ reaches the predetermined value $k$ (49 in FIG. 5), the display switch (not shown) is turned off (50 in FIG. 5), and the display cycle is finished (51 in FIG. 5).

As is apparent from the above, the control of the selection circuits 13, 14 is completely independent from the control of the memory 21.

It should be appreciated that, in the apparatus of FIG. 4, the computation of the velocity gradient is very accurate since the same is performed in a digital form, and the computation speed of the ray path is very fast since it is performed in an analog form. Accordingly, the hybrid ray path analyzer of FIG. 4 has both the advantages of a digital ray path analyzer and those of an analog ray path analyzer.

Figure 6:
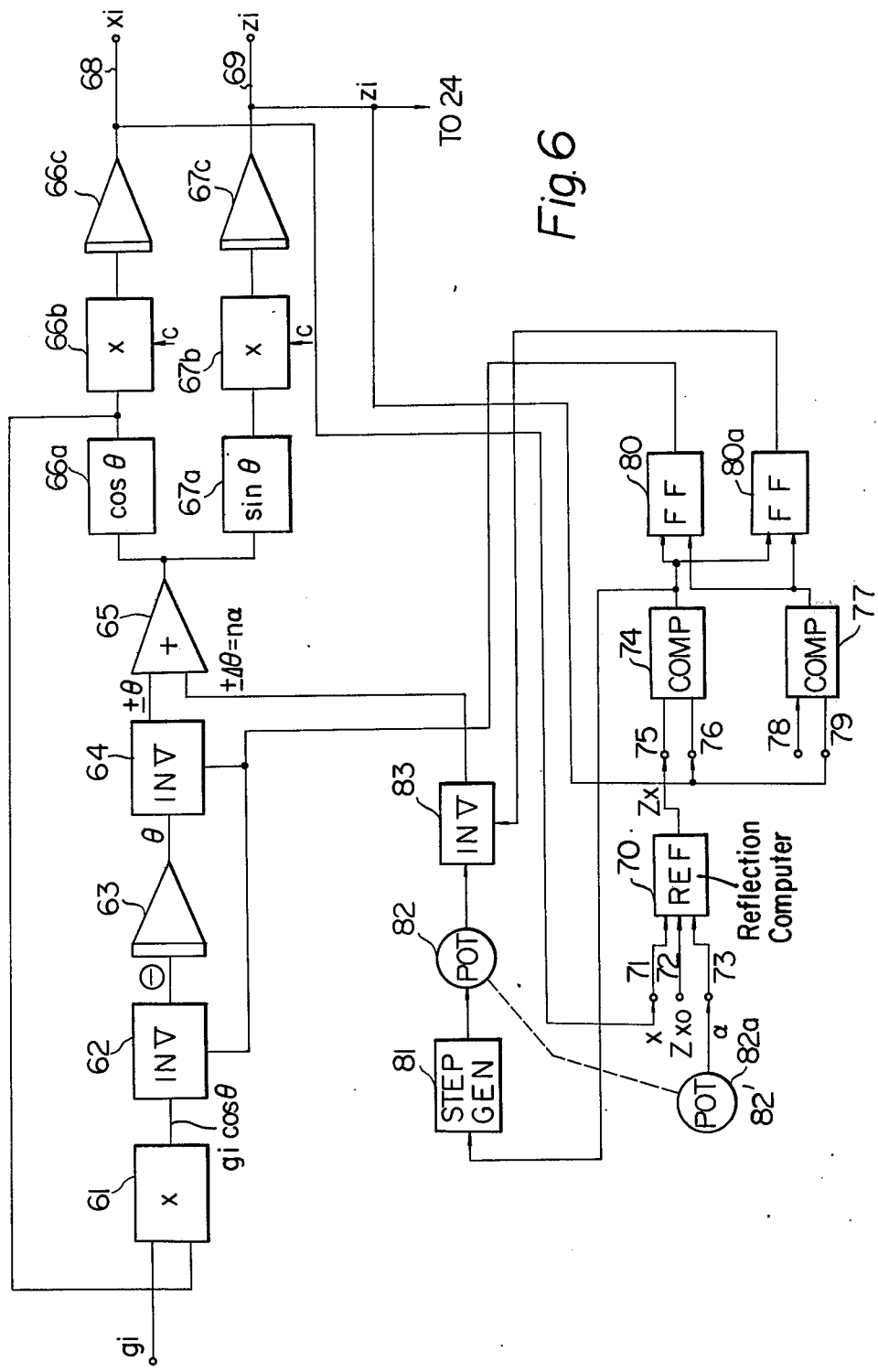
FIG. 6 is a block-diagram of the ray angle computer 16 in FIG. 4.
Figure 7:
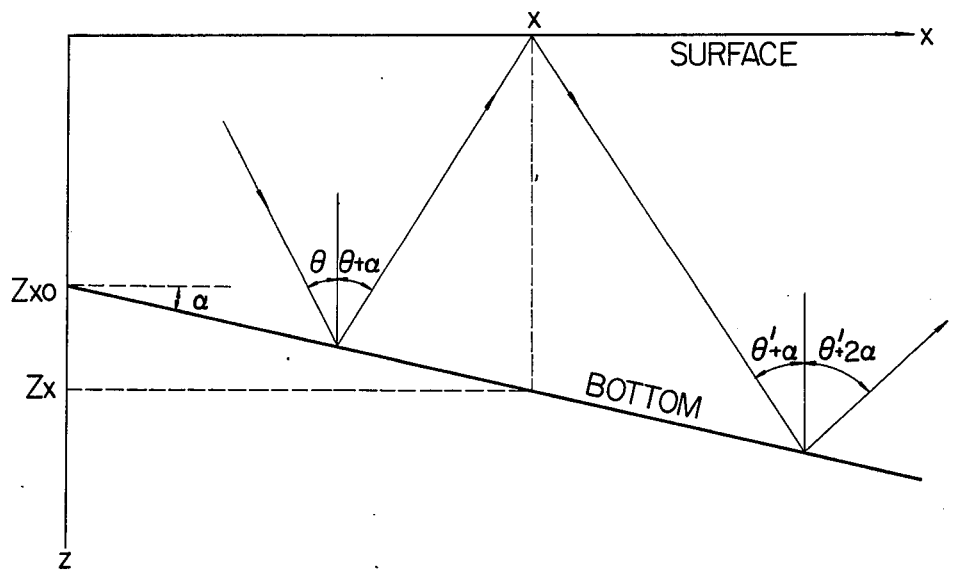
FIG. 7 is a curve for the explanation of the operation of the ray angle computer of FIG. 6.

FIG. 6 shows the block-diagram of the improved ray angle computer, and FIG. 7 is a curve for the explanation of the operation of the ray angle computer in FIG. 6. The advantage shown in FIG. 6 is that the result of the computation is accurate even when the sea bottom is inclined. In FIG. 6, the reference numeral 61 is a multiplier, 62 is an inverter, 63 is an integrator, 64 is an inverter, 65 is an adder, 66a is a function generator of $\cos \theta$, 66b, is a multiplier, 67a is a function generator of $\sin \theta$, 67b is a multiplier, 66c and 67c are integrators, 68 and 69 are output terminals, 70 is a reflection computer 71, 72, 73 are terminals, 74 and 77 are comparators, 75, 76, 78 and 79 are terminals, 80 and 80a are flip-flops, 81 is a step wave generator, 82 and 82a are potentiometers for setting an incline angle, and 83 is an inverter.

At first, the operation of the ray angle computer in FIG. 6 when the sea bottom is flat and no reflection occurs will be explained. The multiplier 61 receives two inputs, the velocity gradient $g_i$ from the digital-analog convertor 23 (FIG. 4) and the value of $\cos \theta$, and provides the product $g_i \cdot \cos \theta$. The inverters 62 and 64 invert the input signal only when the flip-flop 80 provides a positive signal to the inverter, and it is assumed that the output of the flip-flop 80 is negative at this time. Therefore, the integrator 63 receives $g_i \cos \theta$, integrates the same and provides $\theta = -\int g_1 \cos \theta dt$. The value of $\theta$ is applied to the first input of the adder 65, the second input of which receives no signal. Therefore, the output of the adder 65, is $\theta$, which is applied to the function generators 66a, 67a which provide $\cos \theta$ and $\sin \theta$, respectively. The multipliers 66b67b provide the products $C \cos \theta$, $C \sin \theta$, respectively. These values are integrated by the integrators 66c and 67c, and the coordinates $(x, z)$ of the ray path is obtained at the output terminals 68 and 69. The coordinates $(x, z)$ is applied to a display unit (not shown). The value $z$ is also applied to the analog-digital convertor 24 (FIG. 4).

Next, the operation of FIG. 6 when the sea bottom is inclined and reflection of the ray path occurs, will be explained. The necessary adjustment of the ray path for the inclination of the sea bottom and the reflection is the inversion of the ray angle for reflection and the adjustment of $\theta$ for the inclination of the sea bottom. Assuming that the angle of the inclination of the sea bottom is $\alpha$, and the first angle of incidence of the ray path is $\theta$, the first angle of reflection is $\theta + \alpha$ as shown in FIG. 7, and if the second angle of incidence is $\theta' + \alpha$, the second angle of reflection is $(\theta' + \alpha) + \alpha = \theta' + 2\alpha$. Generally, at the $n$-th reflection, if the angle of incidence is $\theta$ ignoring the inclination of the sea bottom, then the angle of reflection considering the inclination of the sea bottom is $\theta + n\alpha$.

In FIG. 6, the reflection computer 70 computes the actual depth of the sea from the surface to the bottom by the following equation $$Z_x = Z_{x0} x \tan \alpha$$

where $Z_x$ is the depth at the distance $x$, $Z_{x0}$ is the depth at the initial point, $x$ is the distance between the initial point and the point for computing the ray angle, and $\alpha$ is the angle of the sea bottom (see FIG. 7). The reflection computer 70 receives three inputs signals $x$, $Z_{x0}$ and $\alpha$ through the terminals 71, 72, 73 respectively. The value $x$ is the $x$ coordinate of the ray path from the output terminal 68. The value $Z_{x0}$ is a predetermined value and so a predetermined voltage is applied to the terminal 72. The value $\alpha$ is set by the potentiometer 82a. The output $Z_x$ of the reflection computer 70 is applied through the terminal 75 to one input of the comparator 74, the other input of which receives the $z$ of the ray path from the output terminal 69 through the terminal 76. The comparator 74 provides the output signal and triggers the flip-flop 80 whenever $Z_x$ becomes the same as $z$, that it to say, the ray path reaches the sea bottom. The flip-flop is triggered also by the comparator 77, which provides the output signal whenever the ray path reaches the sea surface. The comparator 77 receives two input signals, one of which from the terminal 78, is a predetermined value and represents the sea surface, and the other of which is from the output terminal 69 through the terminal 79 and represents the Z-coordinate of the ray path.

The output of the flip-flop 80 is applied to the control inputs of the inverters 62, and 64. These inverters invert the input signal only when a positive signal is applied to control inputs of the inverters. Due to the above nature of the inverters, the sign and/or the polarity of the angle $\theta$ at the output of the inverter 64 changes whenever the ray path reaches the sea bottom and/or sea surface. The change of the sign of the angle $\theta$ effects the reflection of the ray path (see FIG. 7).

When the path is reflected at the sea bottom, the angle $\theta$ of reflection must be adjusted by $n\alpha$ as mentioned before. The adjustment is effected by the step wave generator 81 and the potentiometer 82. The potentiometer 82 is mechanically connected with the potentiometer 82a and sets the angle $\alpha$ of the inclination of the sea bottom. The output voltage of the step wave generator 81 goes up by a predetermined step whenever the comparator 74 provides an output signal to the step wave generator 81. Therefore, the output voltage of the potentiometer 82 after the ray path is reflected $n$-times at the sea bottom is proportional to $n\ \alpha$. The output of the potentiometer 82 is through the inverter 83 to the second input of the adder 65. The control input of inverter 83 is connected to the output of the flip-flop 80a this inverter inverts the input signal only when a positive signal is applied to control input of the inventer.

The flip-flop 80a is triggered by the comparator 74 and reset by the comparator 77. Thus this inverter provides the adjusted ray angle $+\theta +n\ \alpha$.

Figure 8A:
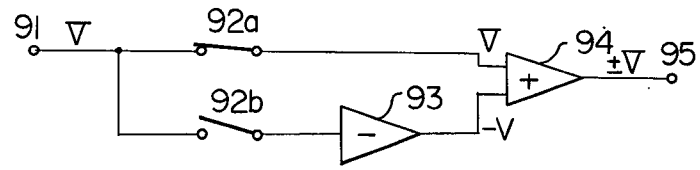
FIG. 8 is a block-diagram of two embodiments of the controllable inverters 62, 64 and 83 in FIG. 6.
Figure 8B:
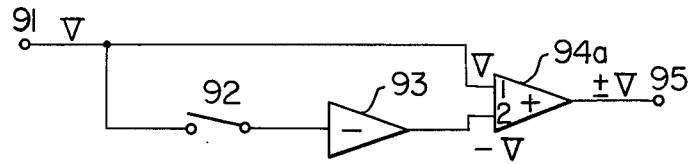

FIGS. 8(A) and 8(B) show two embodiments of the circuit diagram of the inverters 62, 64 and 83 in FIG. 6. In FIGS. 8(A) and 8(B), reference numeral 91 is an input terminal, 92, 92a, and 92b are electronic switches controlled by the output of the flip-flops 80 and 80a in FIG. 6, 93 is an inverter element, 94 and 94a are adders, and 95 is an output terminal. In FIG. 8(A) when the switch 92a is closed and the switch 92b is opened, the sign of the output voltage of the adder 94 is the same as that of the input voltage, while, when the switch 92a is opened and the switch 92b is closed, the sign of the output voltage is opposite to that of the input voltage. Thus, the circuit in FIG. 8(A) operates as a controlled inverter. On the other hand, in FIG. 8(B), only a single switch 92 is provided, and the adder 94a is arranged to add two inputs, one of which has the weight of two times that of the other. When the switch 92 is opened, the input voltage V appears at the output of the adder 94a, and when the switch 92 is closed, the adder 94a receives the inputs V, and $<2V$, and thus, provides the output $-V$. The circuit of FIG. 8(B) has the advantage of having a simple structure and a high operational reliability.

It should be appreciated that sound rays on a screen outside the detection range of the sonar system can be displayed with broken lines as shown in FIG. 2(B), by simply attaching a propagation distance computer described in U.S. Pat. No. 3,832,537, to the present ray path analyzer in FIG. 4.

From the foregoing, it will now be apparent that a new and improved hybrid computer for displaying sound rays of a sonar system has been found. It should be understood, of course, that the embodiments disclosed herein are only illustrative and are not intended to limit the scope of the invention. Reference should be made to the appended claims, therefore, rather than to the specification, as indicating the scope of the invention.

What is claimed is;

1. An apparatus for analyzing and displaying sound ray paths comprising:
   a. a pair of switching means for setting sea depth ($Z_i$) and the temperature of sea water ($T_i$);
   b. a velocity gradient computer connected to said switching means through a pair of selection circuits for computing a velocity gradient ($g_i$) with the equation $$g_i = \frac{C_{i+1} - C_i}{Z_{i+1} - Z_i}$$

where $Z_i$, $Z_{i+1}$, are $i$-th and $(i+1)$-th sea depth set by switches, and $C_i$ and $C_{i+1}$ are $i$-th and $(i+1)$th sound velocity in the sea water at the depth $Z_i$ and $Z_{i+1}$, respectively;

c. memory means connected to said velocity gradient computer for storing a plurality of sets of ($g_i$, $Z_i$) in a digital form;
   d. a digital-analog converter connected to said memory means through a read out circuit for converting a set ($g_i$, $Z_i$) from a digital form to an analog form;
   e. a ray angle computer connected to said digital analog converter for computing and displaying the coordinates ($x$, $z$) of the ray path with the equations;

$$\theta = -\int g_i \cos\theta\, dt$$
$$dx = C \cos\theta\, dt$$
$$dz = C \sin\theta\, dt$$

where $C$ is a sound velocity in the sea water at the depth $z$, and
   f. a comparator for comparing $Z_i$ with $z$ and controlling the operation of said read out circuit according to the result of the comparison.

2. An apparatus for analyzing and displaying sound ray paths according to claim 1, wherein said ray angle computer comprises:
   a. means for computing an angle $\theta$ at least having a series of concatenated multipliers, controllable inverters, an integrator, and said multiplier receiving a value of $g_i$ and $\cos\theta$;
   b. modification means for modifying the value of said angle $\theta$;
   c. means for computing the coordinate ($x$, $z$) from the modified angle at least having a series of concatenated function generators one of $\cos\theta$ and $\sin\theta$, a multiplier for multiplying a sound velocity in the sea water and an integrator;
   d. a reflection computer for computing $$Z_x = Z_{xO} + x \tan\alpha$$

where $Z_{xO}$ is the sea depth at the distance $X=O$, $X$ is the distance from the initial point, and $\alpha$ is the angle of inclination of the sea bottom set by a potentiometer;
   e. a first comparator for comparing $Z_x$ with $z$ and providing an output pulse whenever $z$ reaches $Z_x$;
   f. a second comparator for comparing $z$ with a predetermined value and providing an output pulse whenever $z$ reaches said predetermined value;
   g. a first flip-flop triggered by the output pulses of said first and second comparators, for controlling the operation of the controllable inverters in the present ray angle computer;
   h. a step wave generator for generating a step wave voltage according to the output pulse of said first comparator;
   i. a second potentiometer connected to said first potentiometer, connected to the output of said step wave generator; and
   j. a second flip-flop triggered by the output pulses of said first comparator, and reset by the output pulses of said second comparator, for controlling the operation of a controllable inverter inserted between said second potentiometer and said modification means.

3. An apparatus for analyzing and displaying sound ray paths according to claim 2, wherein each of said controllable inverters comprises an adder, one input of which having weight $+1$ which input is connected to an input terminal and the other input of which having a weight $-2$, an electronic switch connected to said input terminal, and an inverter element, the input of which is connected to said electronic switch and the output of which is connected to the latter input of said adder.

* * * * *

UNITED STATES PATENT AND TRADEMARK OFFICE
CERTIFICATE OF CORRECTION

PATENT NO. : 4,038,530
DATED : July 26, 1977
INVENTOR(S) : Masahiro Miyahara and Hideo Suzuki It is certified that error appears in the above-identified patent and that said Letters Patent are hereby corrected as shown below:

Col. 2, line 1 - change "$Z_\nu$" to --$Z_i$, --.

Col. 2, line 1 - change "and" to --are--.

Col. 2, line 1 - change "ith" to --i-th--.

Col. 2, line 6 - change "($g_\nu$ $Z_i$)" to ($g_i$, $Z_i$)--.

Col. 2, line 10 - change "($g_\nu$ $Z_i$)" to --($g_i$, $Z_i$)--.

Col. 2, line 15 - change "$\theta = \int g \cos \theta \, dt$" to --$\theta = -\int g \cos \theta \, dt$--.

Col. 3, line 30 - change "($T_\nu$ $Z_i$)" to --($T_i$, $Z_i$)--.

Col. 3, line 37 - change "($T_\nu$ $Z_i$)" to --($T_i$, $Z_i$)--.

Col. 3, line 38 - change "($T_\nu$ $T_{i+1}$, $Z_\nu$ $Z_{i+1}$)" to --($T_i$, $T_{i+1}$, $Z_i$, $Z_{i+1}$)--.

Col. 3, lines 41-42 - change "($T_\nu$ $T_{i+1}$)" to --($T_i$, $T_{i+1}$)--.

Col. 3, line 42 - change "($Z_\nu$ $Z_{i+1}$)" to --($Z_i$, $Z_{i+1}$)--.

Col. 3, line 58 - final "dt" should be in italics.

Col. 3, line 51 - change "$Z_\nu$" to --$Z_i$,--.

Col. 4, line 23 - after "11" insert a --,--.

UNITED STATES PATENT AND TRADEMARK OFFICE
CERTIFICATE OF CORRECTION

PATENT NO. : 4,038,530
DATED : July 26, 1977
INVENTOR(S) : Masahiro Miyahara and Hideo Suzuki It is certified that error appears in the above-identified patent and that said Letters Patent are hereby corrected as shown below:

Col. 4, line 19 - change "f17" to --17--.

Col. 4, line 32 - change "($T_i$ $Z_i$)" to --($T_i$, $Z_i$)--.

Col. 4, line 37 - change "($Z_i$ $g_i$)" to --($Z_i$, $g_i$)--.

Col. 4, line 57 - change "($g_i$ $Z_i$)" to --($g_i$, $Z_i$)--.

Col. 4, line 60 - change "($g_i$ $Z_i$)" to --($g_i$, $Z_i$)--.

Col. 5, line 9 - change "($g_i$ $Z_i$)" to --($g_i$, $Z_i$)--.

Col. 5, line 11 - change "($g_i$ $Z_i$)" to --($g_i$, $Z_i$)--.

Col. 5, line 45 - after "66b" insert a --,--.

Col. 5, line 46 - after "computer" insert a --,--.

Col. 5, line 61 - change "$\theta = -\int g_1 \cos \theta \, dt$" to

--$\theta = -\int g_i \cos \theta \, dt$--

Col. 5, line 66 - change "66b67b" to --66b, 67b--.

Col. 6, line 8 - change "the reflection" to --for reflection--.

Col. 6, line 24 - change "$Z_x = Z_{xo} x \tan a$" to --$Z_x = Z_{xo} + x \tan \alpha$--.

Col. 6, line 38 - after "z" insert --coordinate--.

Col. 6, line 49 - change "Z-coordinate" to --Z coordinate--.
Col. 6, line 60 - before "path" insert --ray--.
Col. 6, line 61 - change "no" to --n$\alpha$--.

UNITED STATES PATENT AND TRADEMARK OFFICE
CERTIFICATE OF CORRECTION

PATENT NO. : 4,038,530
DATED : July 26, 1977
INVENTOR(S) : Masahiro Miyahara and Hideo Suzuki It is certified that error appears in the above-identified patent and that said Letters Patent are hereby corrected as shown below:

Col. 7, line 11 - change "$+ \theta + n\ a$" to $-- \pm \theta \pm n\alpha. --$.

Col. 7, line 32 - change "$<2V$" to $-- -2V --$.

Col. 7, line 65 - change "$Z_y$" to $--Z_i, --$.

Col. 7, line 66 - change "$Ci_{+1}$" to $--C_{i+1} --$.

Col. 8, line 2 - change "$(g_y\ Z_i)$" to $--(g_i,\ Z_i)--$.

Col. 8, line 6 - change "$(g_y\ Z_i)$" to $--(g_i,\ Z_i)--$.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks